(12) United States Patent
Jang et al.

(10) Patent No.: US 12,715,350 B2
(45) Date of Patent: Aug. 25, 2026

(54) MULTI-STAGE ARMREST STRUCTURE

(71) Applicant: DAS CO., LTD, Gyeongsangbuk-do (KR)

(72) Inventors: Yoon Ju Jang, Gyeonggi-do (KR); Young Joon Kim, Gyeonggi-do (KR); Min Kyu Kim, Gyeonggi-do (KR)

(73) Assignee: DAS CO., LTD (KR)

( * ) Notice: Subject to any disclaimer, the term of this patent is extended or adjusted under 35 U.S.C. 154(b) by 172 days.

(21) Appl. No.: 18/396,517

(22) Filed: Dec. 26, 2023

(65) Prior Publication Data

US 2025/0187509 A1 Jun. 12, 2025

(30) Foreign Application Priority Data

Dec. 6, 2023 (KR) ........................ 10-2023-0175223

(51) Int. Cl.
*B60N 2/75* (2018.01)

(52) U.S. Cl.
CPC .................................... *B60N 2/767* (2018.02)

(58) Field of Classification Search
CPC .......... B60N 2/767; B60N 2/763; B60N 2/75; B60N 2/777
See application file for complete search history.

(56) References Cited

U.S. PATENT DOCUMENTS 5,597,209 A * 1/1997 Bart ....................... B60N 2/767
297/440.1
5,702,157 A * 12/1997 Hurite .................... B60N 2/767
297/411.32
10,486,567 B2 * 11/2019 Roeglin ................... B60N 2/77
11,731,543 B2 * 8/2023 Nuss ...................... B60N 2/943
297/411.32
2012/0133189 A1 * 5/2012 Kobayashi ............. B60N 2/767
297/411.38
2014/0175850 A1 * 6/2014 Roeglin ................. A47C 7/543
297/463.1
2022/0176858 A1 * 6/2022 Beck ...................... B60N 2/787
2023/0356637 A1 * 11/2023 Kim ....................... B60N 2/943
2025/0058686 A1 * 2/2025 Beck ...................... B60N 2/787

FOREIGN PATENT DOCUMENTS

DE 102023100308 A1 11/2023

OTHER PUBLICATIONS

Office Action for German Application No. 102023212982.5 mailed Aug. 16, 2024, 3 pages.

* cited by examiner

*Primary Examiner* — Chi Q Nguyen

(57) ABSTRACT

A multistage armrest structure includes a shaft installed on a seat and mounted at one end to rotate relative to an armrest, a housing attached to the armrest, through which the other end of the shaft passes, and supporting the shaft in the installed stat on the armrest, a pair of brackets fixed to the shaft, a ratchet rotatably mounted on a hinge member attached to the pair of brackets, a sector gear unit attached to the armrest to rotate together and engaging with the ratchet, and an elastic member disposed between the bracket and the ratchet, applying rotational directional elastic force for engagement between ratchet gear teeth formed on the ratchet and sector gear teeth formed on the sector gear unit and simultaneously preventing axial movement of the ratchet between the pair of brackets.

8 Claims, 8 Drawing Sheets

MULTI-STAGE ARMREST STRUCTURE

CROSS REFERENCE TO RELATED APPLICATION

The present application claims priority to Korean Patent Application No. 10-2023-0175223, filed Dec. 6, 2023, the entire contents of which is incorporated herein for all purposes by this reference.

BACKGROUND OF THE INVENTION

Field of the Invention

The present invention relates to a multistage armrest structure, and more particularly, to a multistage armrest structure capable of adjusting the locking state of the armrest embedded in the seat with a single elastic member to support the user's arm.

Description of the Related Art

Seats in vehicles like cars or trains typically feature armrests, enabling passengers to adopt a comfortable posture by resting their arms on the upper part.

Armrests can help to relieve passenger fatigue caused by long-term riding, or prevent passengers from suddenly tilting to one side in the event of sudden acceleration, sharp turns, or sudden braking.

Armrests are typically mounted on the sides of the seatback, on both sides or on one side, so that passengers can rest their arms. Armrests are typically mounted on the outside of the seatback, designed to provide comfortable support for passengers' arms.

In addition, armrests can be placed in a horizontal position with the interior floor, allowing passengers to rest their arms, and when not in use, pivoted around the axis provided on one side, enabling them to be stowed in parallel to the seatback.

Also, the armrests are designed to be adjustable to support the arms at an angle according to the passenger's convenience. However, this requires multiple gear and spring mechanisms in a complex structure, which can make the armrest heavier and larger.

In the conventional method of applying a ratchet structure to maintain the locking or unlocking state of an armrest, in addition to a spring for restoring the rotation direction of the ratchet, additional auxiliary components such as a plate spring and ball bearing are required to prevent axial flow of the ratchet, resulting in an increase in the number of components and weight of the armrest.

DOCUMENTS OF RELATED ART (Patent Document 1) Korean Patent Registration No. 10-2031263

SUMMARY OF THE INVENTION

The present invention has been conceived to solve the above problems and it is an object of the present invention to provide a multistage armrest structure capable of achieving a lightweight design by reducing the number of components through structural simplification.

The objects of the present invention are not limited to the aforesaid, and other objects not described herein with be clearly understood by those skilled in the art from the descriptions below. The objects of the present invention can also be achieved by the means and combinations thereof as set forth in the claims.

In order to accomplish the above objects, a multistage armrest structure according to a preferred embodiment of the present invention includes a shaft installed on a seat and mounted at one end to rotate relative to an armrest, a housing attached to the armrest, through which the other end of the shaft passes, and supporting the shaft in the installed stat on the armrest, a pair of brackets fixed to the shaft, a ratchet rotatably mounted on a hinge member attached to the pair of brackets, a sector gear unit attached to the armrest to rotate together and engaging with the ratchet, and an elastic member disposed between the bracket and the ratchet, applying rotational directional elastic force for engagement between ratchet gear teeth formed on the ratchet and sector gear teeth formed on the sector gear unit and simultaneously preventing axial movement of the ratchet between the pair of brackets.

In addition, the ratchet includes ratchet body pivotally attached to the hinge member, ratchet gear teeth formed at one end of the ratchet body and engaging with the sector gear teeth, and a ratchet fixing protrusion protruding from one side of the ratchet body and insertably supported by the elastic member.

In addition, the elastic member includes a coupling portion coupled to the bracket, a slot portion into which the ratchet fixing protrusion is selectively inserted and supported, and a bending portion connecting the coupling portion and the slot portion, providing elastic restorative force to move the coupling portion and the slot portion, when brought close together, away from each other.

In addition, the sector gear unit includes a sector gear unit body attached to the armrest, sector gear teeth formed along a side of the sector gear unit body for engagement with the ratchet gear teeth, a first engagement jaw formed on one end of the sector gear unit body to catch one end of the ratchet body, and a second engagement jaw formed on the other end of the sector gear unit body to catch the other end of the ratchet body.

In addition, the slot portion includes a first slot configured to maintain the locking state of the armrest upon the ratchet fixing protrusion being inserted, and a second slot formed between the first slot and the bending portion and configured to maintain the unlocked state of the armrest upon the ratchet fixing protrusion being inserted.

In addition, the ratchet gear teeth, based on the armrest being rotated in the first direction, move to the end of the sector gear teeth, which causes the ratchet body to be caught by the first engagement jaw and rotate, and simultaneously, which causes the second slot applies a downward force in the restoration direction of the bending portion to the ratchet fixing protrusion, causing the ratchet fixing protrusion to disengage from the first slot and be inserted into the second slot.

In addition, the ratchet body, based on the armrest being rotated in the second direction, is caught by the second engagement jaw and rotates, and the first slot applies a downward force in the restoration direction of the bending portion to the ratchet fixing protrusion, causing the ratchet fixing protrusion to disengage from the second slot and be inserted into the first slot.

In addition, the shaft includes a shaft body installed in the seat by penetrating a shaft penetration hole formed in the housing, a flange portion expanding radially from the shaft body to have a diameter larger than the shaft penetration hole and adhering to the housing, a bracket attachment portion protruding axially from the flange portion and engagingly attached to a shaft attachment hole formed in the bracket, and a pivot shaft protruding axially from the bracket attachment portion and inserted into a rotation hole formed in the armrest for rotational support.

DETAILED DESCRIPTION OF THE INVENTION

Figure 1:
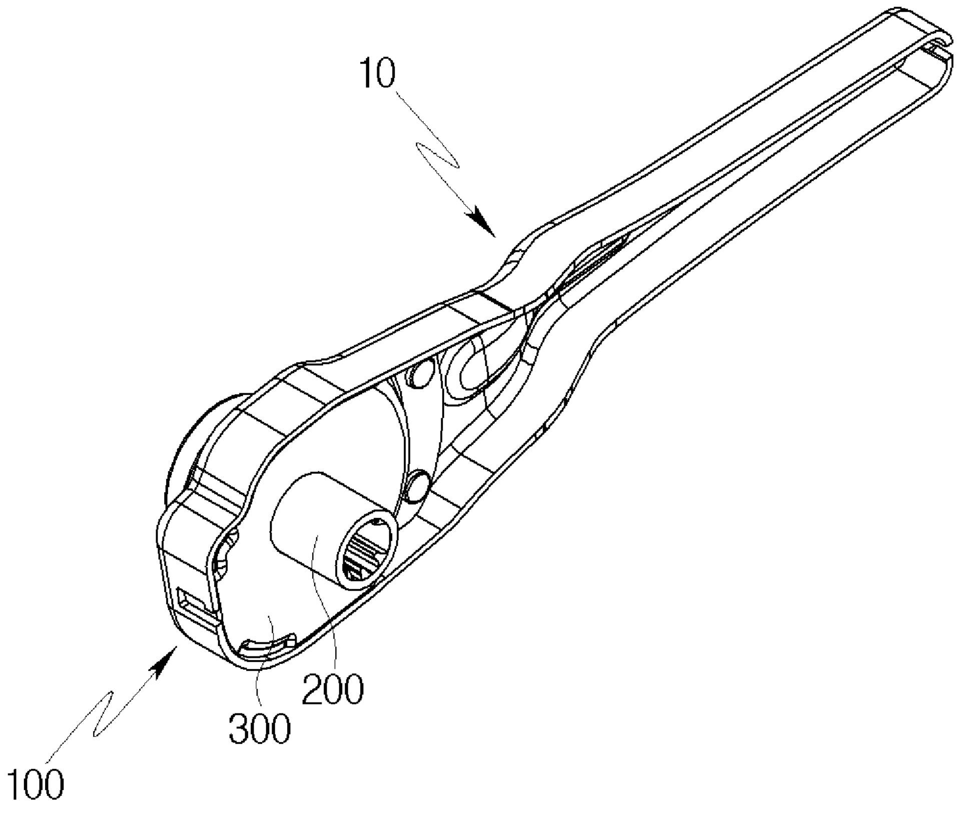
FIG. 1 is a perspective view illustrating a multistage armrest structure according to an embodiment of the present invention.

Hereinafter, preferred embodiments of the present invention are described with reference to the accompanying drawings in detail.

The present invention can be implemented in diverse embodiments with various modifications, as specifically illustrated in the drawings and comprehensively described in the specification. However, such modifications and embodiments are not intended to limit the invention and should be construed including all changes, equivalents, and substitutes within the spirit and scope of the invention.

The terminology used herein is for the purpose of describing particular embodiments only and is not intended to be limiting of the invention. The singular forms are intended to include the plural forms as well unless the context clearly indicates otherwise.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

In addition, terms like "unit" or "member," as indicated in the specification, denote a functional or operational entity that may be realized through hardware or a combination of hardware elements.

Additionally, within the specification, the term 'upper' denotes the direction moving upward in the height direction of the drawing, while the term 'lower' signifies the direction moving downward in the height direction of the drawing.

Furthermore, the differentiation of component names as first, second, and so forth in this specification is intended for distinguishing components with same names, and it is not strictly confined to the order presented in the descriptions.

Hereinafter, embodiments of the present invention are described in detail with reference to accompanying drawings.

Figure 2:
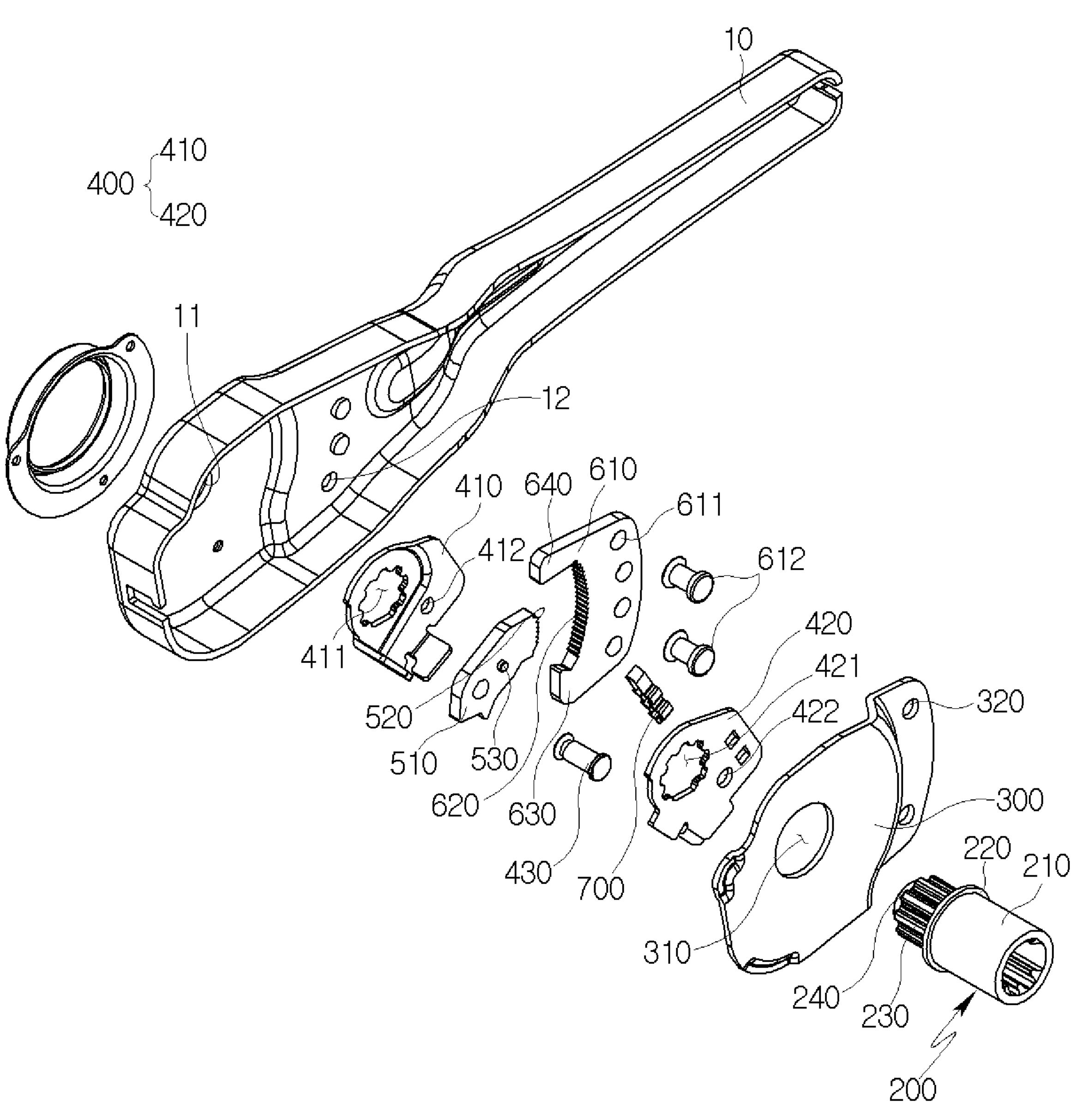
FIG. 2 is an exploded perspective view illustrating a multistage armrest structure according to an embodiment of the present invention.
Figure 3:
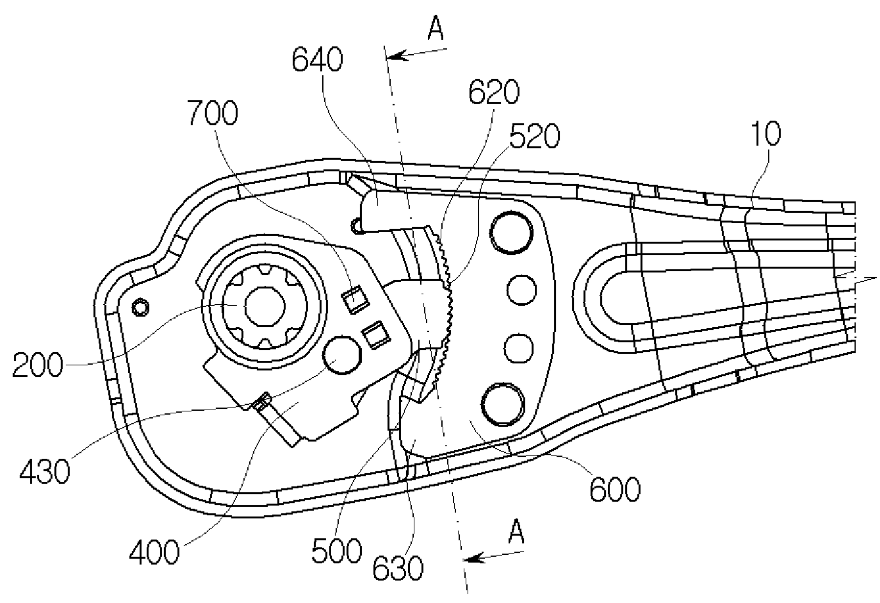
FIG. 3 is a side cross-sectional view illustrating the multistage armrest structure according to an embodiment of the present invention.
Figure 4:
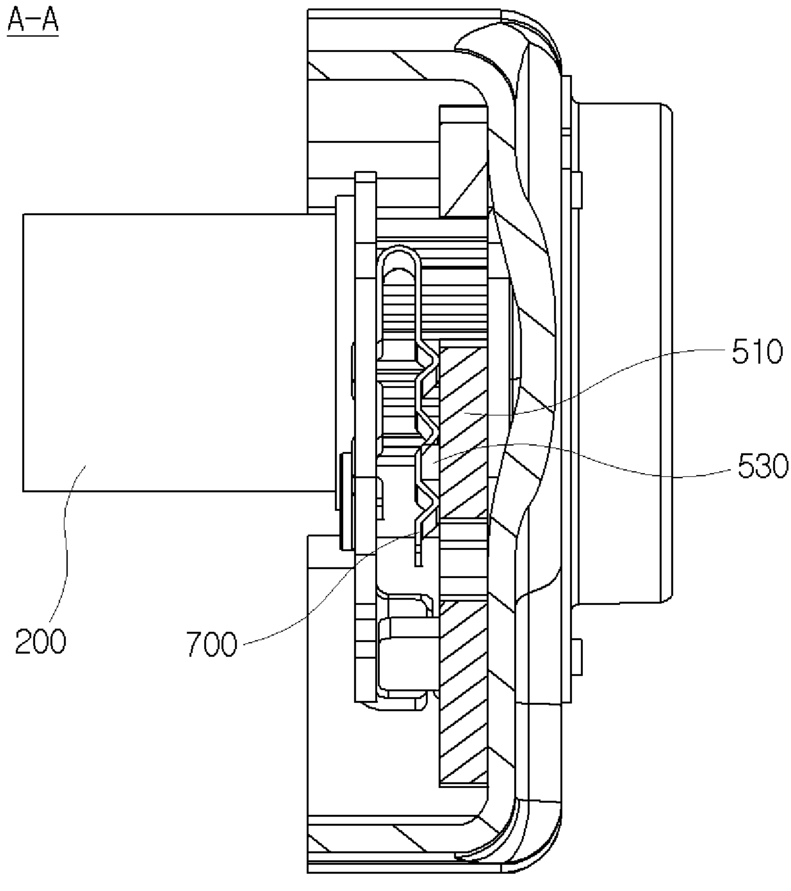
FIG. 4 is a cross-sectional view taken along line A-A of FIG. 3 illustrating the multistage armrest structure according to an embodiment of the present invention.
Figure 5:
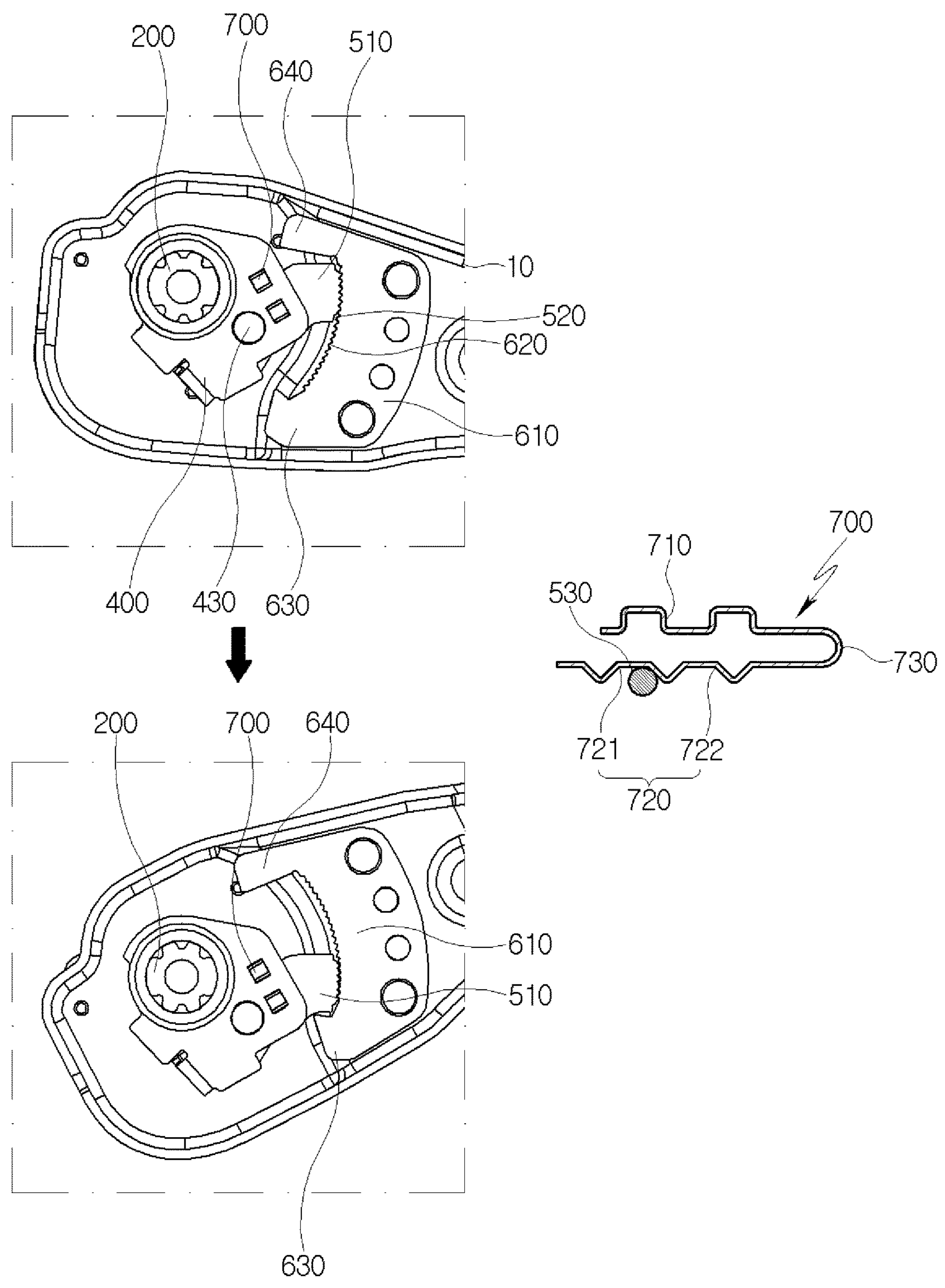
FIG. 5 shows cross-sectional views illustrating the multistage armrest structure along with the position of the ratchet fixing protrusion inserted into an elastic member when the armrest is in the locked state according to an embodiment of the present invention.
Figure 6:
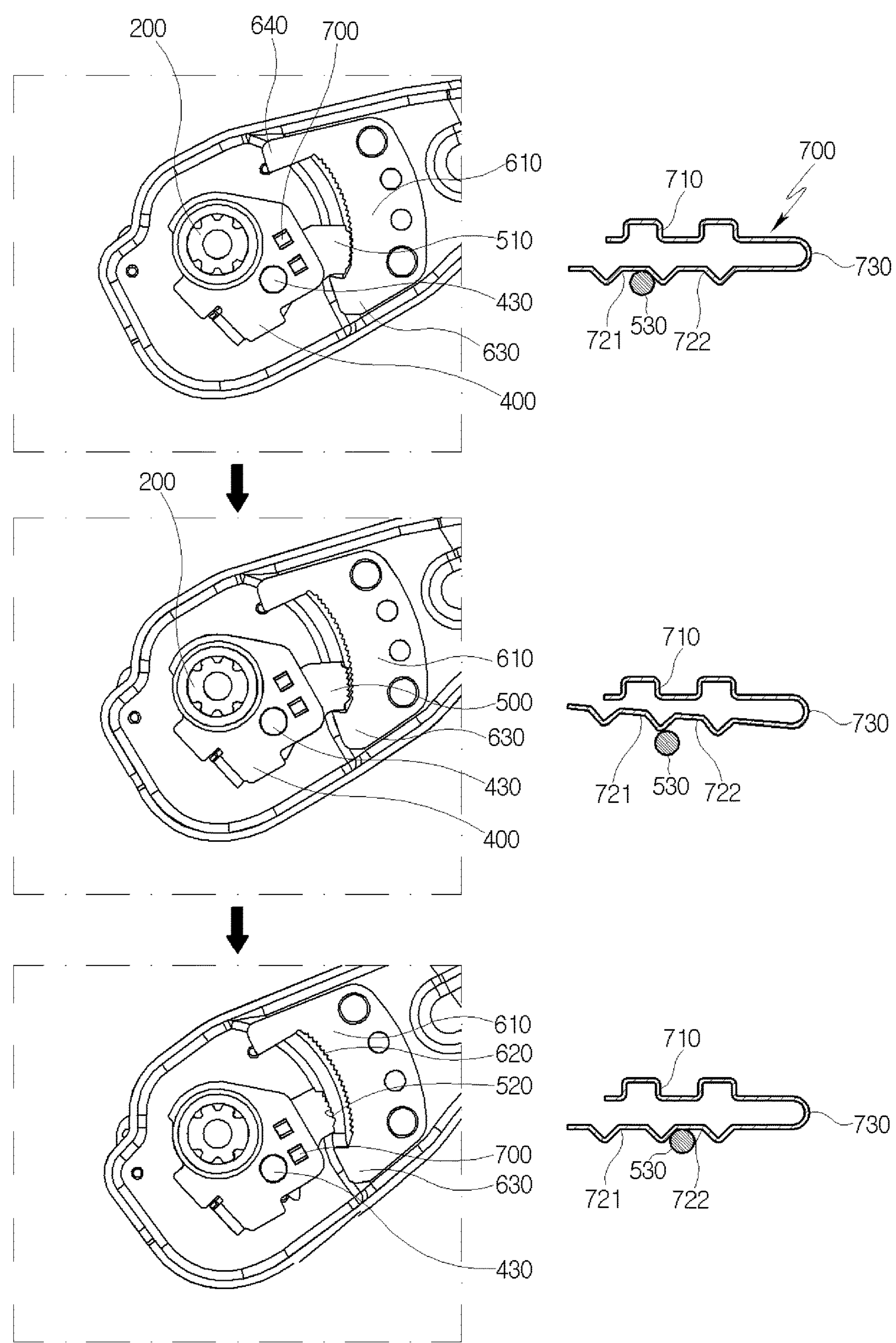
FIG. 6 is cross-sectional views illustrating the multistage armrest structure along with the position change of the ratchet fixing protrusion while the armrest is transitioning to the unlocked state according to an embodiment of the present invention.
Figure 7:
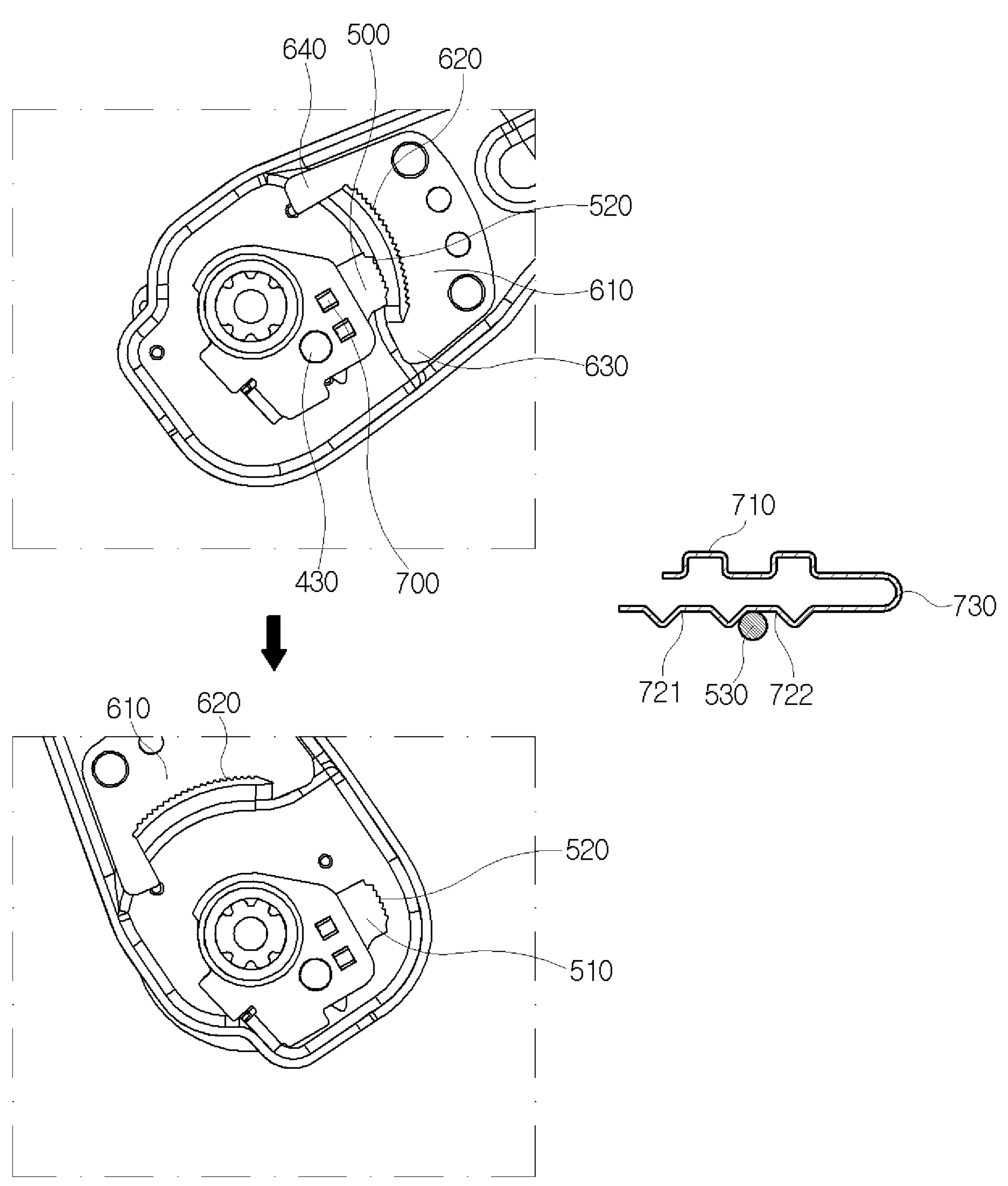
FIG. 7 shows cross-sectional views illustrating the multistage armrest structure along with the position of the ratchet fixing protrusion when the armrest is in the unlocked state according to an embodiment of the present invention.
Figure 8:
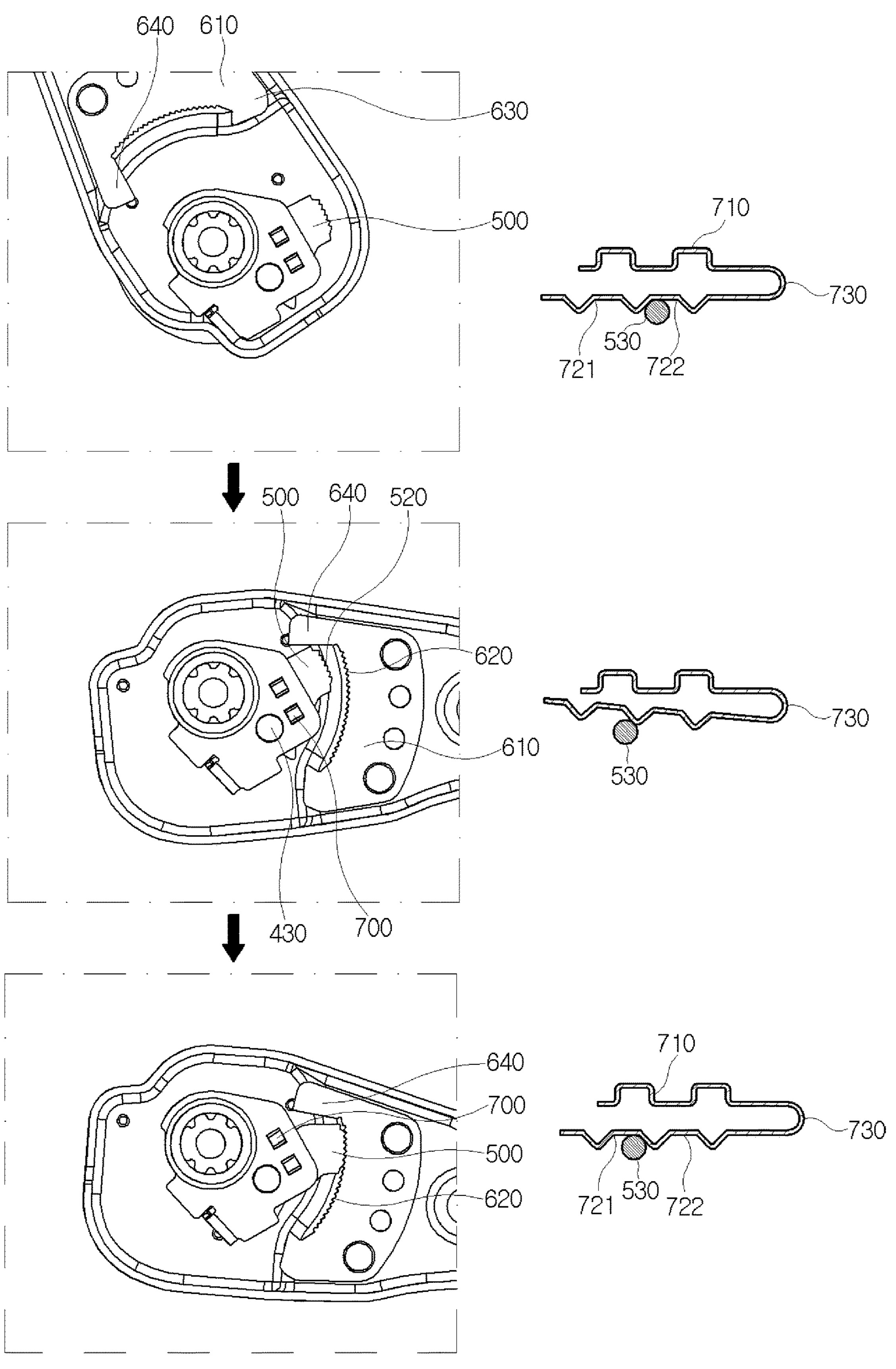
FIG. 8 shows cross-sectional views illustrating the multistage armrest structure along with the position change of the ratchet fixing protrusion while the armrest is transitioning to the locked state according to an embodiment of the present invention.

FIG. 1 is a perspective view illustrating a multistage armrest structure according to an embodiment of the present invention, FIG. 2 is an exploded perspective view illustrating a multistage armrest structure according to an embodiment of the present invention, FIG. 3 is a side cross-sectional view illustrating the multistage armrest structure according to an embodiment of the present invention, FIG. 4 is a cross-sectional view taken along line A-A of FIG. 3 illustrating the multistage armrest structure according to an embodiment of the present invention, FIG. 5 shows cross-sectional views illustrating the multistage armrest structure along with the position of the ratchet fixing protrusion when the armrest is in the locked state according to an embodiment of the present invention, FIG. 6 is cross-sectional views illustrating the multistage armrest structure along with the position change of the ratchet fixing protrusion while the armrest is transitioning to the unlocked state according to an embodiment of the present invention, FIG. 7 shows cross-sectional views illustrating the multistage armrest structure along with the position of the ratchet fixing protrusion when the armrest is in the unlocked state according to an embodiment of the present invention, and FIG. 8 shows cross-sectional views illustrating the multistage armrest structure along with the position change of the ratchet fixing protrusion while the armrest is transitioning to the locked state according to an embodiment of the present invention.

With reference to FIGS. 1 to 8, the multistage armrest structure 100, according to an embodiment of the present invention, includes a shaft 200 installed on the seat (not shown), a housing 300 that rotatably mounts the shaft 200 on the armrest 10, a bracket 400 fixedly attached to the shaft 200, a ratchet 500 pivotally connected to the bracket 400, a sector gear unit 600 attached to the armrest 10 and engaging with the ratchet 500, and an elastic member 700 attached to the ratchet 500 to apply elastic force to engage it with the sector gear portion 600.

Here, the elastic member 700 is disposed between the bracket 400 and the ratchet 500, applying rotational directional elastic force to cause engagement between the ratchet gear teeth 520 formed on the ratchet 500 and the sector gear teeth 620 formed on the sector gear unit 600 and simultaneously preventing axial movement of the ratchet 500 between the pair of brackets 400.

The armrest 10, in the initial locking state, may be rotated within a certain angular range in the first direction, maintaining the engagement state between the ratchet 500 and the sector gear unit 600, which allows the user to use the armrest 10 in the desired angular position.

Here, the first direction refers to the direction of rotating the armrest 10 upward based on FIG. 3, and the second direction refers to the direction of rotating the armrest 10 downward based on FIG. 3.

When the armrest 10, locked in a preset angle, is rotated in the first direction, the armrest 10 may be rotated until almost upright, releasing the locking and positioning itself in parallel to the seatback. In this state, when the armrest 10 is rotated again in the second direction by the same angle as the initial locking state of the armrest 10, the armrest 10 may return to the locked state.

To perform these actions, the armrest 10 is installed to rotate on the seat through the shaft 200.

The shaft 200 is installed on the seat, with one end installed to rotate relative to the armrest 10. The shaft 200 is fixed to the armrest 10 in a rotatable state by the housing 300. The housing 300 is attached to the armrest 10, and the opposite end of the shaft 200 penetrates through the housing 300. The housing 300 is designed to support the shaft 200 in the state of being installed on the armrest 10.

In more detail, the shaft 200 includes a shaft body 210 installed in the seat by penetrating the shaft penetration hole 310 formed in the housing 300, a flange portion 220 expanding radially from the shaft body 210 to have a diameter larger than the shaft penetration hole 310 and adhering to the housing 300, a bracket attachment portion 230 protruding axially from the flange portion 220 and engagingly attached to the shaft attachment holes 411 and 421 formed in the bracket 400, and a pivot shaft 240 protruding axially from the bracket attachment portion 230 and inserted into the rotation hole 11 formed in the armrest 10 for rotational support.

That is, the shaft 200 is installed by inserting the pivot shaft 240 into the rotation hole 11 of the armrest 10, and when the housing 300 is attached to the armrest 10, the shaft body 210 protrudes through the shaft penetration hole 310 of the housing 300 to the outside, and the flange portion 220 adheres to the inner side of the housing 300, allowing the armrest 10 to be rotationally installed on the shaft 200.

The bracket 400 is inserted and secured to the bracket attachment portion 230 of the shaft 200, thereby being fixedly attached to the shaft 200.

The bracket 400 is formed as a pair. For example, the bracket 400 may be composed of a bracket body 410 and a bracket cover 420 that is attached to the bracket body 410.

The bracket body 410 is positioned on the inner surface of the armrest 10 and includes a shaft attachment hole 411 into which the bracket attachment portion 230 of the shaft 200 is inserted and attached, and a hinge member attachment hole 412 through which a hinge member 430 for pivotally attaching the ratchet 500 is inserted.

The bracket cover 420 is placed in close contact with the flange portion 220 of the shaft 200, and is fixed to the bracket body 410 while the ratchet 500 is inserted into the hinge member 430 to prevent the ratchet 500 from axially disengaged. The bracket cover 420 is formed with a shaft attachment hole 421 into which the bracket attachment portion 230 of the shaft 200 is inserted and fastened, and a hinge member attachment hole 422 through which the hinge member 430 is inserted.

Here, the shaft attachment holes 411 and 421 are formed with circumferential grooves, and the outer surface of the bracket attachment portion 230 of the shaft 200 is shaped with corresponding protrusions, ensuring that the shaft 200 is fixed without relative rotation.

The ratchet 500 is pivotally attached to the hinge member 430 fastened to the pair of brackets 400. In more detail, the ratchet 500 includes a ratchet body 510 pivotally attached to the hinge member 430 by being inserted and fastened for rotation, a ratchet gear teeth 520 formed at one end of the ratchet body 510 and engaging with the sector gear teeth 620, and a ratchet fixing protrusion 530 protruding from one side of the ratchet body 510 and insertably supported by the elastic member 700.

With this configuration, when the ratchet 500 is placed facing the sector gear unit 600, the ratchet gear teeth 520 may move along the sector gear teeth 620 while engaging with the sector gear teeth 620 due to the elastic force of the elastic member 700.

The ratchet 500 is pivotally attached to the hinge member 430 fixed to the bracket 400, and the ratchet gear teeth 520 engages with the sector gear teeth 620 due to the elastic force of the elastic member 700.

The sector gear unit 600 is attached to the armrest 10 to rotate together with the armrest 10 and configured to engage with the ratchet 500.

In more detail, the sector gear unit 600 includes a sector gear unit body 610 attached to the armrest 10, sector gear teeth 620 formed along the side of the sector gear unit body 610 for engagement with the ratchet gear teeth 520, a first engagement jaw 630 formed on one end of the sector gear unit body 610 to catch one end of the ratchet body 510, and a second engagement jaw 640 formed on the other end of the sector gear unit body 610 to catch the other end of the ratchet body 510.

The sector gear unit body 610 is formed with a plurality of fastening portions 611. The sector gear unit body 610 is fastened to the housing 300 by the fixing bolts 612 passing through fastening portions 611, the armrest hole 12 formed on the inner surfaces of the armrest 10, and the housing holes 320 formed on the housing 300.

The sector gear teeth 620 are formed over a longer region than the ratchet gear teeth 520, allowing the ratchet gear teeth 520 to engage with and move along the sector gear teeth 620.

With reference to FIG. 5, the initial locking state of the armrest 10 refers to the state in which the ratchet gear teeth 520 are engaged with one end of the sector gear teeth 620. On the other hand, the armrest 10 locked in a preset angle refers to the state in which that the ratchet gear teeth 520 are engaged with the other end of the sector gear teeth 620.

The elastic member 700 includes a coupling portion 710 coupled to the bracket 400, a slot portion 720 into which the ratchet fixing protrusion 530 is selectively inserted and supported, and a bending portion 730 that connects the coupling portion 710 and the slot portion 720, providing elastic restorative force to move the coupling portion 710 and the slot portion 720, when brought close together, away from each other.

With this configuration, the elastic member 700 applies rotational directional elastic force to the ratchet 500, causing the ratchet gear teeth 520 to engage with the sector gear teeth 620. Moreover, the elastic restorative force of the bending portion 730 may prevent axial flow of the ratchet 500 between the pair of brackets 400.

The slot portion 720 includes a first slot 721 and a second slot 722. The first slot 721 is configured to maintain the locking state of the armrest 10 when the ratchet fixing protrusion 530 is inserted. The second slot 722 is formed between the first slot 721 and the bending portion 730 and configured to maintain the unlocked state of the armrest 10 when the ratchet fixing protrusion 530 is inserted. The first slot 721 and the second slot 722 are formed continuously to allow the ratchet fixing protrusion 530 to move continuously through the first slot 721 and the second slot 722.

With reference to FIGS. 5 to 7, the multistage armrest structure 100 according to an embodiment of the present invention can release the locking state of the armrest 10 by rotating the armrest 10 in the first direction.

When the armrest 10 is rotated in the first direction, the ratchet gear teeth 520 move to the end of the sector gear teeth 620, which causes the ratchet body 510 to be caught by the first engagement jaw 630 and rotate, and simultaneously, which causes the second slot 722 applies a downward force in the restoration direction of the bending portion 730 to the ratchet fixing protrusion 530, causing the ratchet fixing protrusion 530 to disengage from the first slot 721 and be inserted into the second slot 722.

In more detail, as shown in FIG. 5, when the armrest 10 is rotated in the first direction from the initial locking state of the armrest 10, causing the ratchet gear teeth 520 to move from one end to the other end of the sector gear teeth 620, the armrest 10 may be locked in a preset angle. In this case, the ratchet fixing protrusion 530 remains inserted into the first slot 721. The first slot 721 may maintain the locking state of the armrest 10 by applying a restoration-direction load to the ratchet fixing protrusion 530 in the restoration direction of the ratchet body 510.

With reference to FIG. 6, when the armrest 10 is locked in a preset angle, rotating the armrest 10 in the first direction causes the ratchet body 510 caught by the first engagement jaw 630 to rotate. In this case, the ratchet gear teeth 520 disengage from the sector gear teeth 620, releasing the locking state of the armrest 10.

Here, the ratchet fixing protrusion 530 disengages from the first slot 721 and is inserted into the second slot 722 as the ratchet body 510 rotates due to being caught by the first engagement jaw 630. The second slot 722 applies a downward force to the ratchet fixing protrusion 530 in the restoration direction of the bending portion 730 when the ratchet body 510 is caught by the first engagement jaw 630, causing the ratchet fixing protrusion 530 to disengage from the first slot 721.

With reference to FIG. 7, the armrest 10 in the unlocked state may be placed in a side storage position of the seatback. In this case, a stopper may be formed on the inner side of the armrest 10 to restrict the top storage position of the armrest 10. The ratchet fixing protrusion 530 may be maintained in the inserted state in the second slot 722, allowing the ratchet body 510 to remain in a non-rotational state.

With reference to FIG. 8, in the multistage armrest structure 100 according to an embodiment of the present invention, when the armrest is rotated in the second direction, the ratchet body 510 is caught by the second engagement jaw 640 and rotates, and the first slot 721 applies a downward force in the restoration direction of the bending portion 730 to the ratchet fixing protrusion 530, causing the ratchet fixing protrusion 530 to disengage from the second slot 722 and be inserted into the first slot 721.

In more detail, when the armrest 10 in the unlocked state as shown in FIG. 7 is rotated in the second direction to the extent that the ratchet body 510 engages with the second engagement jaw 640, the ratchet body 510 is caught by the second engagement jaw 640 and rotates. In this case, the ratchet body 510 rotates encountering interference from the first engagement jaw 630.

When the ratchet body 510 is caught by the second engagement jaw 640 and rotates, the ratchet fixing protrusion 530 inserted into the second slot 722 disengages from the second slot 722. The ratchet fixing protrusion 530, disengaged from the second slot 722, moves toward the first slot 721 under the restorative force of the bending portion 730.

In this case, the ratchet gear teeth 520 engage with the end of the sector gear teeth 620, and the armrest 10 returns to the initial locked state.

In summary, the present invention provides a multistage armrest structure 100 capable of achieving a lightweight design by reducing the number of components through structural simplification, specifically by controlling the locking and unlocking states of the armrest 10 using a single elastic member 700 with two slots.

The present invention can achieve the following effects through the configurations, combinations, and usage relationships described in the embodiments and descriptions below.

The multistage armrest structure of the present invention is advantageous in terms of achieving a lightweight design by reducing the number of components through structural simplification.

Although the present invention has been described in detail through specific embodiments to help understand the invention, it should be understood that the invention is not limited to the disclosed embodiments and can be modified or improved by those skilled in the art within the scope of the technical concept of the invention.

All straightforward modifications or changes are considered part of the present invention, and the scope of the present invention is determined by the attached claims.

DESCRIPTION OF REFERENCE NUMERALS

10: armrest
100: multistage armrest structure
200: shaft
210: shaft body
220: flange portion
230: bracket attachment portion
240: pivot shaft
300: housing
310: shaft penetration hole
320: housing hole
400: bracket
410: bracket body
420: bracket cover
430: hinge member
500: ratchet
510: ratchet body
520: ratchet gear teeth
530: ratchet fixing protrusion
600: sector gear unit
610: sector gear unit body
620: sector gear teeth
630: first engagement jaw
640: second engagement jaw
700: elastic member
710: coupling portion
720: slot portion
721: first slot
722: second slot
730: bending portion

What is claimed is:

1. A multistage armrest structure comprising:

a shaft having one end rotatably coupled to an armrest and a second end;

a housing attached to the armrest, the housing having a shaft insertion hole, the second end of the shaft passes through the shaft insertion hole and the shaft insertion hole supporting the shaft;

a pair of brackets fixed to the shaft;

a ratchet rotatably mounted on a hinge member attached to the pair of brackets;

a sector gear unit attached to the armrest to rotate together and engaged with the ratchet; and an elastic member disposed between the bracket and the ratchet, the elastic member applying a rotational directional elastic force to ensure engagement between ratchet gear teeth formed on the ratchet and sector gear teeth formed on the sector gear unit and simultaneously preventing axial movement of the ratchet between the pair of brackets.

2. The multistage armrest structure of claim 1, wherein the ratchet comprises a ratchet body pivotally attached to the hinge member; ratchet gear teeth formed at one end of the ratchet body and engaged with the sector gear teeth; and a ratchet fixing protrusion protruding from one side of the ratchet body and elastically supported by the elastic member.

3. The multistage armrest structure of claim 2, wherein the elastic member comprises:

a coupling portion coupled to the bracket;

a slot portion into which the ratchet fixing protrusion is selectively inserted and supported; and a bending portion connecting the coupling portion and the slot portion and configured to provide an elastic restorative force such that the coupling portion and the slot portion are elastically restored away from each other in response to the coupling portion and the slot portion being brought close together.

4. The multistage armrest structure of claim 3, wherein the sector gear unit comprises:

a sector gear unit body attached to the armrest, sector gear teeth formed along a side of the sector gear unit body for engagement with the ratchet gear teeth, a first engagement jaw formed on one end of the sector gear unit body to catch one end of the ratchet body; and a second engagement jaw formed on the other end of the sector gear unit body to catch the other end of the ratchet body.

5. The multistage armrest structure of claim 4, wherein the slot portion comprises:

a first slot configured to maintain the locking state of the armrest upon the ratchet fixing protrusion being inserted; and a second slot formed between the first slot and the bending portion and configured to maintain the unlocked state of the armrest upon the ratchet fixing protrusion being inserted.

6. The multistage armrest structure of claim 5, wherein when the armrest rotates in a second direction:

the ratchet gear teeth move to the end of the sector gear teeth, causing the ratchet body to be caught by the first engagement jaw and rotate, and the second slot applies a downward force in a restoration direction of the bending portion to the ratchet fixing protrusion, thereby disengaging the ratchet fixing protrusion from the first slot and inserting it into the second slot.

7. The multistage armrest structure of claim 6, wherein when the armrest rotates in a second direction, the ratchet body is caught by the second engagement jaw and rotates, and this movement causes the first slot applies a downward force in a restoration direction of the bending portion to the ratchet fixing protrusion, thereby disengaging the ratchet fixing protrusion from the second slot and inserting it into the first slot.

8. The multistage armrest structure of claim 1, wherein the shaft comprises:

a shaft body inserted through a shaft penetration hole formed in the housing;

a flange portion expanding radially from the shaft body to have a diameter larger than the shaft penetration hole and adhering to the housing;

a bracket attachment portion protruding axially from the flange portion and engagingly attached to a shaft attachment hole formed in the bracket; and a pivot shaft protruding axially from the bracket attachment portion and inserted into a rotation hole formed in the armrest for rotational support.

* * * * *